United States Patent [19]
Williams

[11] 4,141,434
[45] Feb. 27, 1979

[54] LUBRICATION WAND FOR TRANSMISSION

[75] Inventor: Douglas W. Williams, Waukesha, Wis.

[73] Assignee: Allis-Chalmers Corporation, Milwaukee, Wis.

[21] Appl. No.: 752,561

[22] Filed: Dec. 20, 1976

[51] Int. Cl.$^2$ ............................................. F01M 1/08
[52] U.S. Cl. .................................. 184/6.12; 74/15.84; 184/11 A
[58] Field of Search ................ 184/11 R, 11 A, 7 R, 184/6.26, 53, 55 R, 6.12, 6; 74/15.84; 239/567

[56] References Cited

U.S. PATENT DOCUMENTS

| | | | |
|---|---|---|---|
| 1,277,178 | 8/1918 | Bernhard | 184/11 A |
| 1,484,935 | 2/1924 | Dunann | 184/11 A |
| 1,824,540 | 9/1931 | Grönkwist | 184/6.26 |
| 2,214,485 | 9/1940 | Short | 184/6.12 |
| 2,674,892 | 4/1954 | Keese et al. | 74/15.84 |
| 2,842,226 | 7/1958 | Liebel | 184/6.12 |
| 2,917,132 | 12/1959 | Thomas | 184/6.26 |
| 2,995,211 | 8/1961 | Cohen | 184/6.12 |
| 3,062,060 | 11/1962 | Hoenick et al. | 74/15.84 |
| 3,216,104 | 11/1965 | O'Shields | 74/15.84 |
| 3,605,942 | 9/1971 | Lyth | 184/6.26 |

Primary Examiner—David H. Brown
Attorney, Agent, or Firm—Arthur L. Nelson

[57] ABSTRACT

A lubrication wand for lubrication of bearings in a dry compartment of a power train providing forced lubrication by connection of the lubrication wand to the hydraulic lubrication system.

10 Claims, 4 Drawing Figures

LUBRICATION WAND FOR TRANSMISSION

This invention relates to an oil lubricating system on a vehicle, and more particularly to a lubrication wand for lubrication of bearings in a dry compartment of the power train by providing forced lubrication through the lubrication wand which is removably mounted on the housing supporting the bearings rotatably supporting a drive shaft.

The conventional power transmission includes a provision for lubrication of the bearings. The lubrication of the bearings may be provided for through the gears which rotate in an oil reservoir and cause the oil to run over the gears and shafts and into the bearings to provide lubrication of the bearings in the transmission. Lubrication is provided in some engines by use of a splash system to lubricate the bearings. The splash system operates quite satisfactorily if the proper oil level is maintained and the engine operates on the level. A forced lubrication system, however, is usually provided in transmissions to assure positive lubrication of bearings, shafts and gears for the transmission of power.

This invention provides in a portion of a power train in which there are no rotating gears rotating in an oil reservoir causing the lubricant to be carried by the gears onto the shafts and flowing over the bearings. Antifriction bearings are more easily lubricated since the rolling elements of the antifriction bearings allow the lubricant to flow into the bearings much more readily than the sleeve-type bearing. This invention provides for transmission of power by shafts rotating on antifriction bearings through a compartment. To assure positive lubrication of the bearings, a lubrication wand is inserted into the compartment containing the drive shafts and lubricant is forced through the lubrication wand, out of a plurality of peripheral holes of the wand, and sprayed onto the bearings to assure positive lubrication of the drive shaft bearings. To assure continuous operation of the bearings, the wand is removeably mounted in the housing so that the wand can be removed for servicing and also to determine whether or not the openings in the periphery of the wand are functioning properly.

Accordingly, it is an object of this invention to provide a lubrication wand in a dry compartment of a power train.

It is another object of this invention to provide a lubrication wand providing peripheral spray around the wand for lubrication of parallel shafts in a power transmission.

It is a further object of this invention to provide a removeable lubrication wand for spraying oil in a dry compartment of a power train which is not normally lubricated from the transmission adjacent to the compartment whereby the oil is sprayed peripherally around the wand and sprayed onto antifriction bearings to assure constant lubrication of the bearings so long as the power train is in operation.

The objects of this invention are accomplished by providing a lubrication wand having openings angularly spaced around the wand for spraying on a plurality of bearings in a dry compartment. The lubrication wand is removeably mounted in the housing for extending into the compartment and spraying the bearings when in operation. A suitable fitting provides for the mounting of the wand and also for connection to a conduit from the hydraulic lubrication system in the adjacent transmission housing. The lubrication wand is connected to the hydraulic lubrication system through a suitable fitting to assure a constant supply of pressurized oil for lubrication of the bearings and the fitting is removeably mounted in the housing to assure servicing of the wand and continuous operation to assure positive lubrication.

Referring to the drawings, the preferred embodiment of this invention is illustrated.

Figure 1:
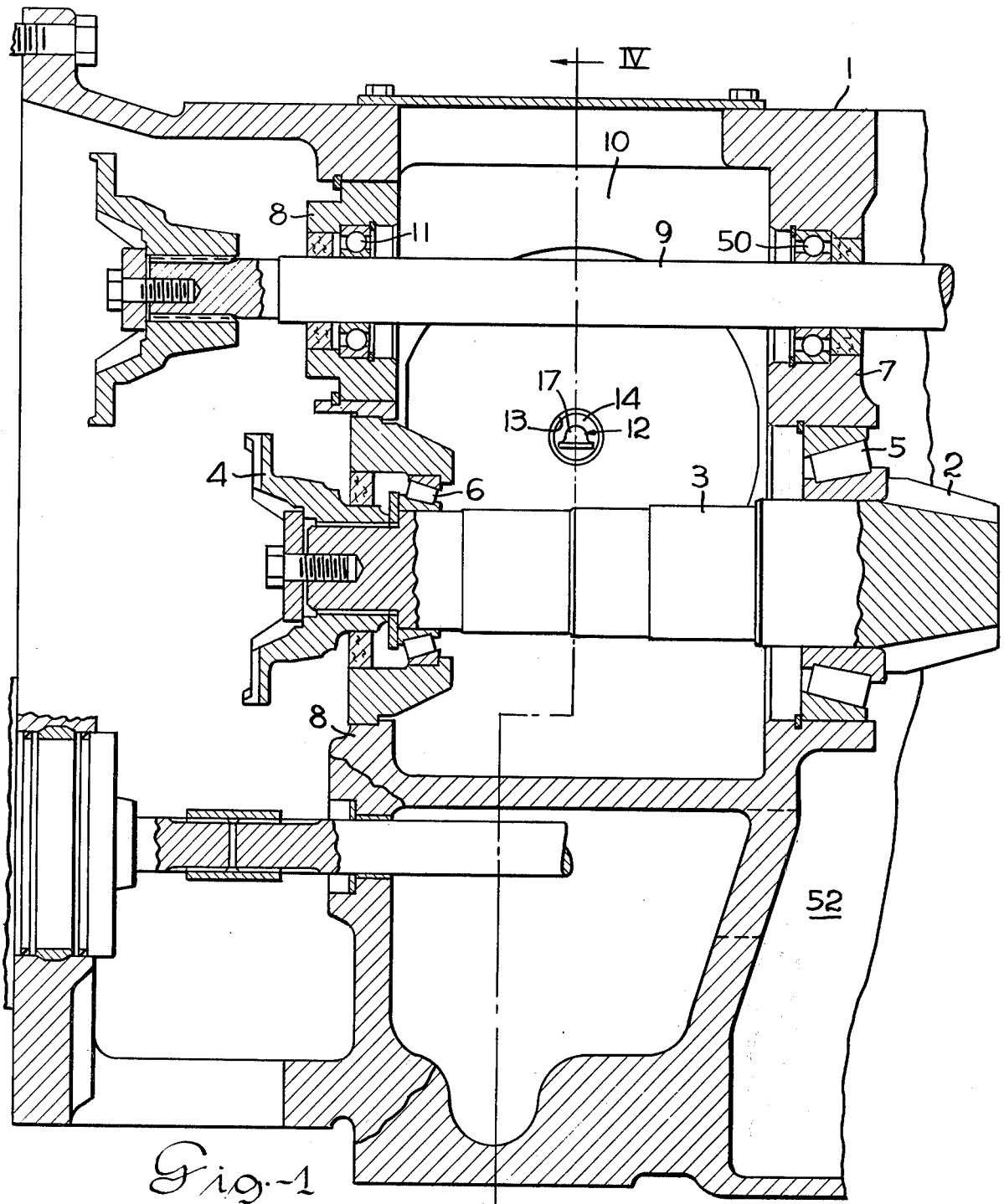
FIG. 1 illustrates a cross section view of the power train housing.
Figures 2, 3:
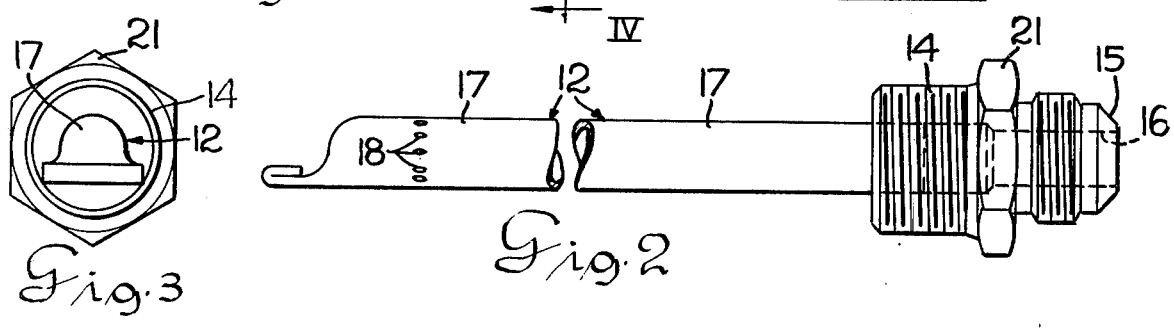
FIG. 2 illustrates a side elevation view of the lubrication wand.
FIG. 3 is an end view of the lubrication wand.

The power train housing 1 is adapted for mounting between a transmission on the left-hand end and the differential on the right-hand end. The differential pinion 2 is integral with the propeller shaft 3 and is provided with a drive fork 4 adapted for driving from a universal joint connected to the propeller shaft. The propeller shaft 3 is rotatably mounted in the roller bearing assembly 5 and the roller bearing assembly 6. The roller bearing assembly 5 is mounted in the end wall 7 while the roller bearing assembly 6 is mounted in the end plate 8.

Similarly, the power takeoff shaft 9 extends through the compartment 10 and is rotatably mounted in a ball bearing assembly 11. The ball bearing assembly 11 is also mounted in the end plate 8.

The P.T.O. shaft 9 is rotatably mounted in a similar bearing 50 mounted in the right-hand side of the power train housing 1. The compartment 10 is a normally dry compartment in which no lubrication is available to the bearings unless brought in from some lubrication system external of the housing. Accordingly, the wand 12 is mounted in the side wall 51 of the housing. A threaded opening 13 threadedly engages the fitting 14 which can be removeably inserted into the compartment as indicated. The fitting 14 is also provided with a tapered end 15 for receiving a flared end of a conduit from a forced lubricating system. The fitting defines a passage 16 which extends internally into the tubular portion 17 of the wand. Forced lubrication is conveyed into the lubricating wand 12 and is sprayed through the plurality of angularly spaced openings 18 which lie in a common plane on the inner end of the tubular structure 17. The wand has a closed internal end causing the pressurized oil to spray from the openings 18 when the forced lubrication system is connected to the wand. The wand 12 can be removeably positioned in the housing by means of the nut 21 formed on the fitting 14 to readily remove and replace the wand as desired.

Figure 4:
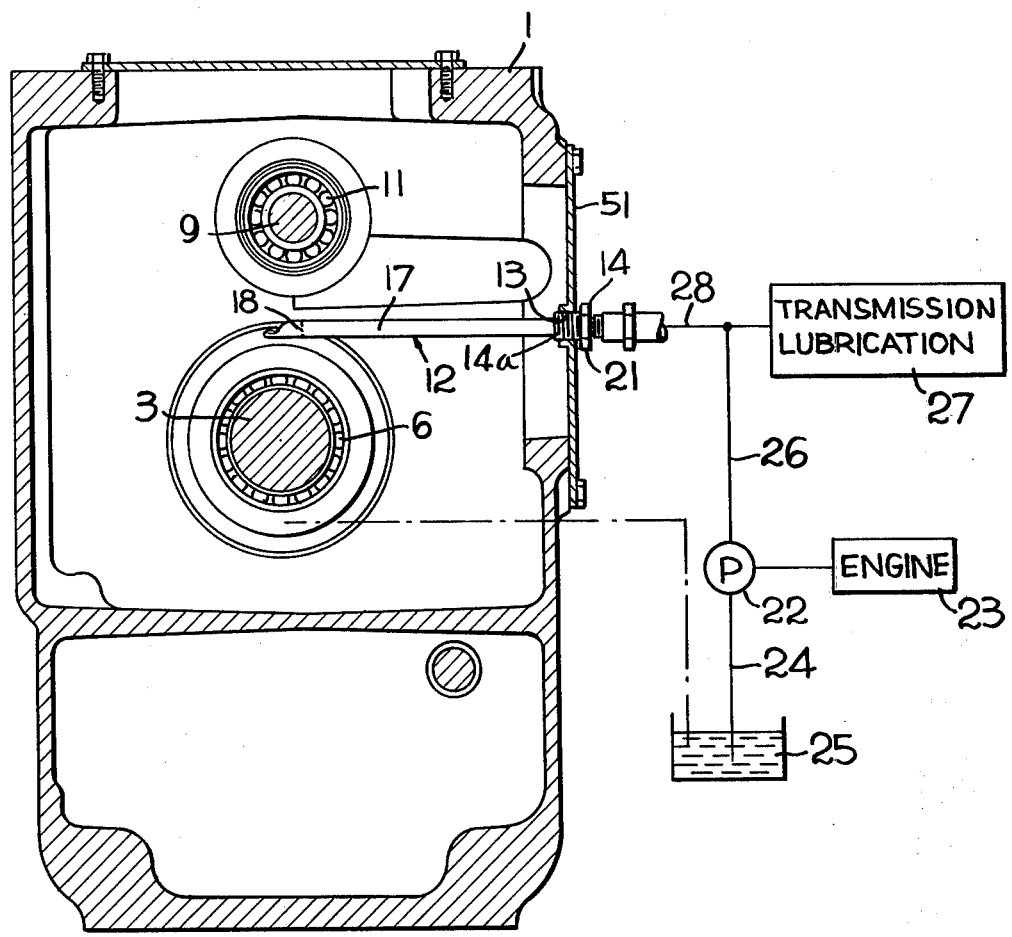
FIG. 4 is a cross section view of the lubrication wand mounted in the power train housing taken on line IV—IV of FIG. 1 showing the engine powered pump which supplies lubricant to the lubrication wand and transmission.

FIG. 4 generally illustrates a forced lubricating system in which a pump 22 is driven by an engine 23 and receiving hydraulic fluid through the conduit 24 from the reservoir 25. The pump pressurizes fluid in the conduit 26 which normally supplies forced lubrication to the transmission 27. Also a conduit 28 supplies forced lubrication to the wand 12 which is sprayed into the power train housing and eventually drains and is returned to the reservoir 25. Excess oil may drain through bearing assembly 5 to chamber 52 and reservoir.

The operation of the device will be described in the following paragraphs.

The engine 23 drives the hydraulic pump 22 and pressurizes fluid in the conduit 26. Conduit 26 is connected to the transmission 27 to provide positive lubrication of the moving components in the transmission. Also the conduit 28 is connected to the conduit 26 to supply pressurized fluid to the lubrication wand 12. The lubrication wand extends into the housing 1 and provides lubrication of the bearings in the power train housing 1. A lubrication wand is formed of a tubular structure 17 with peripheral holes 18 to spray the internal portion of the housing and the bearings 5, 6, 11 and 50. So long as there is pressurized fluid in the wand, the oil spray lubricates the bearings which assures positive lubrication of the bearings so long as the transmission is in operation.

The lubrication wand is provided with a threaded portion 14a and a hexhead 21 to remove the wand from the housing for servicing and to reseat the wand in the transmission housing for lubrication of the power train. Accordingly, a normally dry compartment in the power train is provided with lubrication from the forced lubrication system for the transmission.

The embodiments of the invention in which an exclusive property or privilege is claimed are defined as follows:

1. A lubrication wand for lubricating a compartment in a power train adapted for connection to a forced hydraulic lubrication system in a transmission comprising, a housing including fore and aft walls defining a compartment, a drive system consisting of a drive shaft extending through said compartment, at least one bearing mounted in each wall of said housing rotatably supporting said drive shaft, a lubrication wand mounted in said housing and extending into said compartment including, a tubular structure extending into the said compartment, means defining a plurality of spray openings angularly spaced about the periphery of said tubular structure and positioned in alignment with said shaft for providing a peripheral spray spraying lubricant directly on said shaft and bearings, a fitting connected to the external end of said tubular structure forming a continuous passage through said tubular structure and fitting, a threaded portion on the external periphery of said fitting, a threaded opening in said housing receiving said threaded fitting for mounting said wand for spraying lubrication on said shaft and bearings, fastening means removably fastening said fitting on said housing, a connection on said fitting adapted for connection to an external conduit of the hydraulic lubricating system to provide forced lubrication and cooling of said bearings.

2. A lubrication wand for lubricating a compartment of a power train as set forth in claim 1, including at least two shafts rotatably mounted on said housing and extending through said compartment, at least one bearing on each of said shafts rotatably supporting a mating of said shafts.

3. A lubrication wand for lubricating in a compartment of a power train, as set forth in claim 1, including a plurality of ball bearings rotatably supporting said shaft.

4. A lubricating wand for lubricating in a compartment of a power train as set forth in claim 1 wherein said shaft defines an axis of rotation, said wand defines a longitudinal axis normal to the axis of rotation of said shaft.

5. A lubrication wand for lubricating in a compartment of a power train as set forth in claim 1 wherein said shaft defines a propeller shaft in a vehicle transmission, a power takeoff shaft mounted in said housing extending through said compartment, at least one bearing mounted in said housing rotatably mounting said power takeoff shaft, said wand extending into said compartment to thereby lubricate said bearings.

6. A lubrication wand for lubricating in a compartment of a power train, as set forth in claim 1, wherein said wand defines said plurality of holes lying in a common plane angularly spaced about the periphery of said wand for spraying radially.

7. A lubrication wand for lubricating a compartment of a power train as set forth in claim 1, wherein said bearing defines an antifriction bearing.

8. A lubrication wand for lubricating a compartment of a power train as set forth in claim 1 including a second shaft defining an axis parallel with said first shaft, a plurality of bearings mounting said second shaft, means positioning said wand between said shafts and normal to said shafts, said wand defining said openings in a common plane angularly spaced around said wand with said plane intersecting said shafts and bearings for spraying lubricant on said shafts and bearings to provide positive lubrication.

9. A lubrication wand for lubricating a compartment of a power train as set forth in claim 1, a second shaft mounted parallel with said first shaft, a plurality of bearings rotatably mounting said second shaft in said housing, means positioning said wand between said shafts for spraying lubricant on said bearings.

10. A lubrication wand for lubricating a compartment of a power train as set forth in claim 9, including a plurality of antifriction bearings supporting said drive shaft, means defining said openings of said wand in a common plane angularly spaced around said wand spraying lubricant on said plurality of bearings.

* * * * *